United States Patent [19]
Crockett

[11] 3,867,974
[45] Feb. 25, 1975

[54] EMERGENCY TIRE CHAIN

[76] Inventor: Aulton E. Crockett, Rt. 2, P.O. Box 1032, Cheyenne, Wyo., 82001

[22] Filed: Sept. 6, 1973

[21] Appl. No.: 394,566

[52] U.S. Cl.............. 152/213 R, 152/223, 152/239, 152/241
[51] Int. Cl............................................ B60c 27/06
[58] Field of Search..152/213 R, 223, 239, 226–228, 152/217–219, 231, 241, 242; 238/14; 59/78, 93

[56] References Cited
UNITED STATES PATENTS

| | | | |
|---|---|---|---|
| 1,244,026 | 10/1917 | Callaway | 152/225 |
| 1,258,466 | 3/1918 | Robertson | 238/14 |
| 1,430,471 | 9/1922 | Simon | 238/14 |
| 1,472,511 | 10/1923 | Broomall | 152/225 |
| 2,599,634 | 6/1952 | Holmes | 152/239 |
| 2,704,565 | 3/1955 | Emerson | 152/239 |

Primary Examiner—Drayton E. Hoffman

[57] ABSTRACT

An emergency tire chain device for placement in the intended path of travel of a ground-engaging wheel of a vehicle to improve the traction of the vehicle includes a pair of flexible, longitudinally inextensible elements retained in substantially parallel spaced relationship by longitudinally spaced spacer bars and connecting cross chains with means at one end of the device for securing the device to the ground-engaging wheel and means at the other end for releasably anchoring the device to the ground so that the vehicle can be driven onto the device to extricate itself from an area having a low-traction surface. The end of the device which is releasably anchored to the ground includes clip means for securing that end of the device to the spacer bars or cross chains so that the device can be temporarily mounted on the wheel of the vehicle.

6 Claims, 5 Drawing Figures

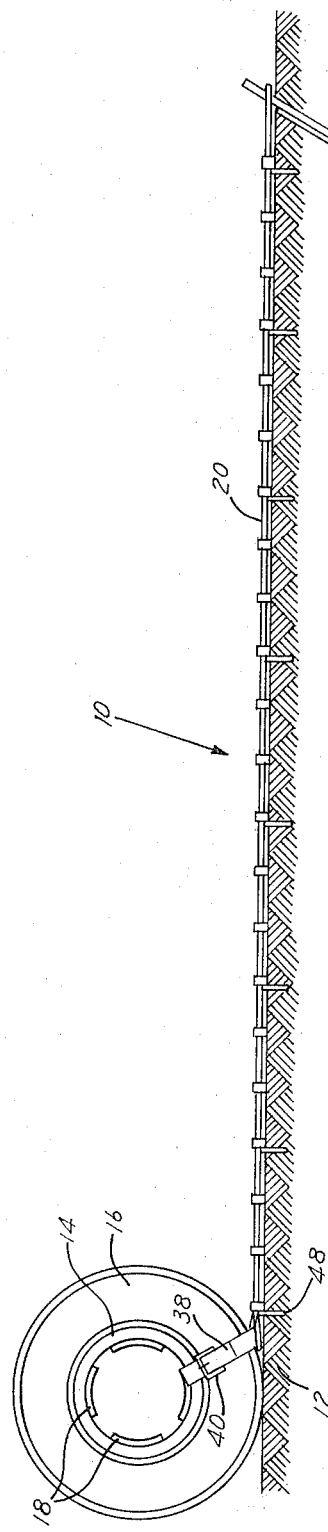
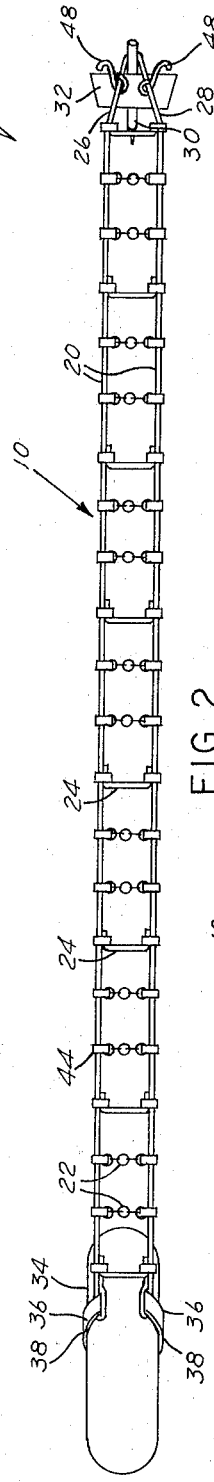
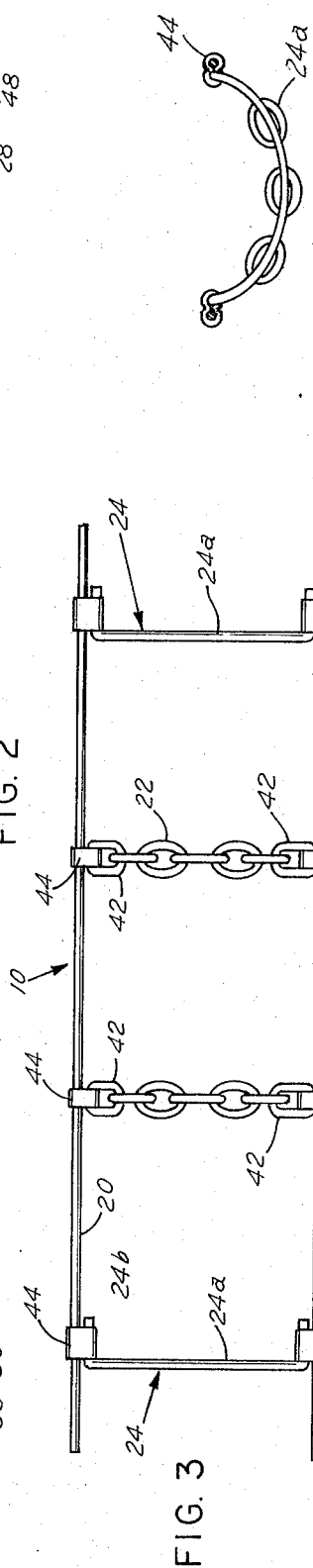
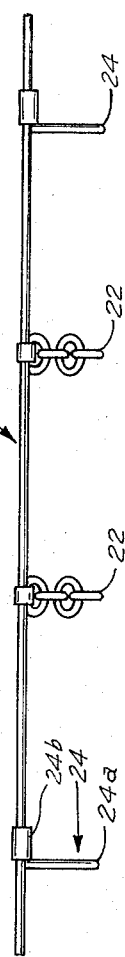
FIG. 1
FIG. 2
FIG. 3
FIG. 4
FIG. 5

EMERGENCY TIRE CHAIN

The present invention generally concerns traction devices for automotive vehicles and more particularly relates to an emergency tire chain adapted to be attached to a ground-engaging wheel of a vehicle and extended along the intended path of travel of the wheel in such a manner that the vehicle may be driven onto the chain with the chain being simultaneously wrapped around the wheel to improve the traction of the vehicle.

Since the inception of automotive vehicles, numerous devices have been conceived for giving added traction to the vehicle in ice, snow, mud or other conditions. Some of these devices have been adapted for use only for short distances to remove a stuck automobile and are not adapted to remain on the tire as the vehicle is driven over extended distances while other devices, such as the conventional tire chain, are adapted to remain affixed to the tire over extended distances. Conventional tire chains are characterized by elongated flexible link chains connected at longitudinally spaced intervals by flexible cross link chains so that the entire device substantially conforms to the wheel on which it is mounted and will flex with the wheel as the vehicle is driven over long distances. One disadvantage with the use of flexible cross link chains is that they do not retain the elongated side link chains in spaced relationship when the chain is being mounted on the wheel so that it is frequently frustrating in mounting tire chains to keep the elongated side link chains on opposite sides of the tire. With certain chain devices devised to remove vehicles from stuck positions, and only for extremely short distances, rigid or semi-rigid spacer members are utilized to retain a desired spacing between side link chains so that the side link chains will remain on opposite sides of the wheel as the wheel is driven onto the chain device. It is difficult, however, when using rigid or semi-rigid spacers to drive the vehicle over an extended distance with the chains mounted on the tire since the more rigid spacer members do not readily flex with the tire and, therefore, are easily broken due to the immense weight of the vehicle and sometimes hard surfaces over which the vehicle is driven.

It is accordingly an object of the present invention to provide an emergency tire chain device which will readily extract a vehicle from a stuck position and which is adapted to be mounted on the wheel of the vehicle so that it can be driven for a limited distance with the chain affixed thereto.

It is another object of the present invention to provide an emergency tire chain which can be extended along the intended path of travel of a ground-engaging wheel of a vehicle and includes means for securing one end of the chain to the wheel of the vehicle and means for anchoring the opposite end to the ground so that the vehicle can be driven onto the chain in extricating itself from a stuck condition.

It is another object of the present invention to provide an emergency tire chain having flexible, longitudinally inextensible side members with both flexible and semi-flexible members interconnecting the side members at longitudinally spaced intervals so that the side elements are retained in desired spaced relationship when a vehicle wheel is driven thereon and so that the chain can be mounted on the wheel and driven over limited distances without damage to the chain.

It is still another object of the present invention to provide a simplified vehicle tire chain construction which is quickly and easily attachable to a vehicle wheel, is well suited for extricating a vehicle from a stuck position, and which can be mounted on the wheel of the vehicle so that the vehicle can be driven for limited distances with the chain mounted thereon.

These and other objects of the present invention are attained with a simplified tire chain construction which is extremely well-suited for extricating a vehicle from a stuck position and which has been designed so that it can be mounted on the vehicle wheel to improve the traction of the vehicle over limited distances of travel over low-traction surfaces.

More particularly, the emergency tire chain device of the present invention has flexible, longitudinally inextensible side members which are adapted to be extended in parallel relationship along the intended line of travel of a ground-engaging wheel of a vehicle and has both flexible and semi-flexible cross members interconnecting the side members at longitudinally spaced intervals to retain the side chain members in desired parallel relationship. In the preferred form, one end of the device has attachment means for securing that end of the device to the wheel of the vehicle and the opposite end has means for releasably anchoring the opposite end to the ground so that the device serves in a winch-like manner to enable the vehicle to be driven onto the device in improving the traction of the vehicle. The end of the device which is adapted to be releasably anchored to the ground, also carries connecting clip members which are adapted to be releasably attached to the flexible or semi-flexible cross members of the device when the device is wrapped around the wheel of the vehicle so that the vehicle can be driven with the device mounted thereon for limited distances. The cross members of the device consist of pairs of flexible cross link chains which are suitably anchored to the side elements at longitudinally spaced intervals and spacer bars of limited flexibility which are disposed between pairs of cross link chains to maintain the desired spacing between the side members and to retain the cross link chains in a relative straight orientation and in normal relationship with the side members so that when the wheel is driven onto the device, the side members will be disposed on opposite sides of the wheel.

It has been found with the particular construction of the present invention that the emergency tire chain is not only well-suited for extricating a vehicle from a stuck position, with the side elements of the device retained in desired spaced relationship on opposite sides of the wheel, but also serves to improve the traction of the vehicle over limited distances of travel by securing the device to the wheel after it has been wrapped therearound.

Other objects, advantages and capabilities of the present invention will become more apparent as the description proceeds taken in conjunction with the accompanying drawings, in which:

FIG. 1 is a side elevation of the emergency tire chain device of the present invention with a vehicle wheel attached to one end thereof, FIG. 2 is a diagrammatic bottom plan view of the emergency tire chain of FIG. 1, FIG. 3 is an enlarged fragmentary top plan view of the tire chain of FIG. 1, FIG. 4 is an enlarged fragmentary side elevation of the emergency tire chain of FIG. 1, and FIG. 5 is an enlarged end elevation of the emergency tire chain of FIG. 1.

In FIG. 1, the emergency tire chain device 10 of the present invention is seen extending over a soft surface 12 such as snow, mud or the like with one end of the device affixed to a conventional power-driven wheel 14 of a vehicle with the wheel 14 having a tire 16 mounted thereon and circumferentially spaced arcuate slots 18 opening through opposite sides of the wheel.

The device 10 is probably best seen in FIG. 2 to have a pair of parallel spaced elongated side members 20 of a flexible, longitudinally inextensible material such as wire rope and with connecting cross members in the form of cross link chains 22 and spacer bars 24 connecting the side members 20 at longitudinally spaced intervals. The leading ends 26 of the side members 20 are interconnected to establish a closed loop 28 shown in the form of a triangle in FIG. 2 so that an anchor rod 30 can be driven into the ground to secure the leading end of the device at a preselected location. The anchor rod 30 in the disclosed form has a plate 32 affixed thereto which extends laterally of the device and serves to prevent the anchor rod 30 from being pulled out of the ground or shifting locations when a longitudinal pull is applied to the device by the wheel of the vehicle.

The trailing end 34 of each side element 20 of the emergency chain device 10 is passed through a reverse loop and connected to itself in any suitable manner to define an enclosed loop 36 to which a longitudinally inextensible strap 38 of nylon or other strong material can be secured. The straps 38 have suitable fastening means 40, such as a buckle, on their free ends to enable the straps to be quickly interconnected and disconnected. In practice, the straps 38 are passed around the tire 16, through one of the arcuate slots 18 in the wheel 14, and secured together so that the trailing end of the device 10 is connected to the wheel in underlying relationship with the tire.

Referring now to FIG. 3, the cross link chains 22 are seen to comprise a short length of link chain having links at opposite ends thereof anchored to the adjacent side members 20. The end links 42 of the cross link chains 22 are anchored in place by a compression-type metal lug or sleeve 44 which extends around the side member 20, through the end link 42 and is compressed in place.

The spacer bars 24, as seen best in FIGS. 3 through 5, have a substantially semi-circular body portion 24a which lies normal to the side members 20 and has end portions 24b extending normally away from its terminal ends. The end portions 24b extend parallel to the side members 20 for a short distance adjacent the inner sides thereof and are anchored thereto by compression-type metal lugs 44 as used with the link connectors. The spacer bars 24 are preferably made of solid cylindrical material having only limited flexibility whereby they will retain the side members 20 in their predetermined parallel spaced relationship but will flex slightly with the tire so as not to easily break when the weight of the vehicle is placed thereon.

It has been found desirable to alternate the spacer bars 24 between pairs of cross link chains 22 to obtain the desired characteristics of both types of cross members. More particularly, the spacer bars 24 will retain the desired spacing between the side members 20 so that it is not necessary to lie beneath the vehicle to space the side members when using the device and the cross link chains 22 will grip low-traction surfaces as the vehicle is driven thereover particularly when the device is mounted on the wheel 14. Too many spacer bars 24 would render the device inappropriate for use when the device is wrapped around and affixed to a wheel since the spacer bars which are of only limited flexibility are less able to flex with the tire than the flexible cross link chains 22. The cross link chains 22, while not being well-suited for maintaining the desired spacing between the side elements 20, are well-suited for gripping low traction surfaces as the vehicle is driven thereover particularly when the device is affixed to the wheel.

When using the emergency tire chain device 10 of the present invention, the connecting straps 38 at the trailing end of the device are affixed to the wheel 14 as previously described and shown in FIGS. 1 and 2 so that the spacer bar at the trailing end of the device is beneath the tire 16 and engaged with a portion thereof. The leading end of the device is positioned in place with the anchor rod 30 after the device has been extended along the ground in alignment with the intended path of travel of the wheel. The vehicle is then driven onto the device with the device serving somewhat like a winch as it is wrapped around the tire. When the wheel reaches the leading end of the device the anchor rod 30 would be removed to free the leading end so that releasable clips 48 mounted on the side members 20 along the closed loop portion of the device could be used to affix the leading end of the device to a cross link chain 22 or spacer bar 24 so that the vehicle could be driven onward with the device serving in the capacity of a conventional tire chain. The clips 48 at the leading end of the device are preferably steel hooks which are permanently attached to the side elements 20 and have hooked end portions which will extend around a connecting link or spacer bar to releasably connect the respective elements.

Accordingly, the emergency tire chain device of the present invention can be seen to be well-suited for extricating a vehicle from a stuck position, particularly from a soft low-traction surface and can then be further used to advance the vehicle for limited distances over the low-traction surface in a manner similar to conventional tire chains. It is to be emphasized that while the device is of the type which can be affixed to the wheel similar to conventional tire chains, it has the desirable characteristics of being self-spreading so that as the vehicle wheel is advanced over the device, the side members will be disposed on opposite sides of the tire and the cross chain members will lie in a straight orientation transversely of the tire.

Although the present invention has been described with a certain degree of particularity, it is understood that the present disclosure has been made by way of example and that changes in details of structure may be made without departing from the spirit thereof.

What is claimed is:

1. In a traction device for use with a power-driven wheel of a vehicle in which a pair of flexible, longitudinally inextensible side members have flexible cross members interconnecting the side members at longitudinally spaced locations, connection means secured to one end of the side members and adapted to be releasably connected to the vehicle wheel, and anchor means are disposed at the ends of the side members opposite to the connection means adapted to be anchored to the ground, the improvement comprising:

spacer members of limited flexibility interconnecting the side members at longitudinally spaced locations spaced between and parallel to said cross members, said spacer members being adapted to maintain a predetermined spacing between the side members and a substantially straight orientation of said flexible cross members so that the cross members are substantially perpendicular to said side members, said spacer members being formed of metal rods each having a substantially semi-circular body portion, said semi-circular body portion extending substantially normal to and downwardly from the side members, and fastening means at opposite ends of each spacer member rigidly attaching each said spacer member to said side members.

2. The traction device of claim 1 wherein said spacer members have end portions at opposite ends of the body portion which extend substantially parallel to the side members and said fastening means defined by compression collars extending around each end portion and the associated side member to secure the spacer member to the side member.

3. The traction device of claim 1 wherein said wheel has at least one opening therethrough and wherein said connection means comprise straps connected individually to the side members and having means thereon for being releasably connected together so that they can be passed through the opening in the wheel to form a closed loop and releasably connect the traction device to the wheel.

4. The traction device of claim 1 wherein said anchor means includes a closed loop formed at the opposite end of the device by the side members and a rod adapted to be passed through the closed loop and driven into the ground to anchor said opposite end to the ground.

5. The traction device of claim 1 further including releasable clip means secured to the side members at said opposite end and adapted to releasably connect said opposite end to a cross member or spacer member when the device is wrapped around the wheel.

6. A traction device adapted for use with a power-driven wheel of a vehicle having at least one opening therethrough, comprising:

a pair of flexible, longitudinally inextensible wire ropes forming a loop at one end of the device and having free ends at the other end, metal spacer bars of limited flexibility interconnecting the wire ropes at longitudinally spaced locations, said spacer bars having a semi-circular body portion lying in a plane substantially normal to the wire ropes and portions extending in parallel adjacent relationship with the wire ropes, flexible cross link chain members interconnecting the wire ropes at longitudinally spaced locations, tgere being two cross link chain members between spacer bars, a plurality of compression collars connecting the end portions of the spacer bars to the wire ropes and connecting the cross link chain members to the wire ropes, a strap connected to the free end of each of the wire ropes and having means thereon for being releasably connected together so that they can be passed through the opening in the wheel to form a closed loop and releasably connect the traction device to the wheel, an anchor rod adapted to be passed through the loop at said one end of the device and embedded in the ground to releasably anchor said one end to the ground, and clip means secured to the wire ropes at said one end of the device and adapted to releasably connect said one end to a spacer bar or to a cross link chain member when the device is wrapped around the wheel.

* * * * *